(12) United States Patent
Wegeng et al.

(10) Patent No.: US 7,739,021 B2
(45) Date of Patent: Jun. 15, 2010

(54) ADAPTIVE RETARDER CONTROL METHOD AND APPARATUS

(75) Inventors: William J. Wegeng, Avon, IN (US);
Randall S. Conn, Indianapolis, IN (US);
Mark A. Rushing, Martinsville, IN (US); Ricke D. Katko, Martinsville, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 650 days.

(21) Appl. No.: 11/622,590

(22) Filed: Jan. 12, 2007

(65) Prior Publication Data

US 2008/0172162 A1 Jul. 17, 2008

(51) Int. Cl.
*G06F 17/00* (2006.01)
(52) U.S. Cl. .............................. 701/70; 477/53; 477/98
(58) Field of Classification Search .................. 701/60, 701/70; 477/53, 98
See application file for complete search history.

(56) References Cited

U.S. PATENT DOCUMENTS

| | | | | |
|---|---|---|---|---|
| 5,225,982 A | * | 7/1993 | Ito et al. ........................ 701/91 |
| 5,358,081 A | * | 10/1994 | Kaneda et al. ............... 188/291 |
| 5,731,977 A | * | 3/1998 | Taniguchi et al. .............. 701/96 |
| 7,380,396 B2 | * | 6/2008 | Kresse .......................... 60/295 |
| 2002/0144851 A1 | * | 10/2002 | Porter .......................... 180/247 |
| 2007/0100530 A1 | * | 5/2007 | Mori et al. ..................... 701/70 |
| 2008/0071453 A1 | * | 3/2008 | Nakanishi et al. .............. 701/70 |

* cited by examiner

*Primary Examiner*—Khoi Tran
*Assistant Examiner*—Rodney King
(74) *Attorney, Agent, or Firm*—Quinn Law Group, PLLC

(57) ABSTRACT

A vehicle transmission retarder control apparatus is provided including an engine, a throttle, a brake, a transmission having an output member with an actual transmission output speed, a speed sensor operable for measuring the actual transmission output speed, a plurality of user-commandable input devices for selecting a desired transmission output speed, and a controller having an algorithm for controlling the amount of retarder request to provide a zero or constant rate of deceleration independently of weight and axle ratio. Additionally, a method is provided for controlling a transmission retarder, including measuring the actual transmission output speed, sensing a desired transmission output speed using a plurality of user-commandable input devices, communicating the actual and desired speeds to a controller, and commanding the retarder to apply a continuously variable opposing torque to the transmission based on the actual and desired output speeds to achieve a constant rate of deceleration.

17 Claims, 2 Drawing Sheets

| MODE ($M_R$) | DESCRIPTION |
|---|---|
| OFF/DISABLED | $\omega_{To}$ DETERMINED BY $T_i$, $B_i$ |
| 1 | STEADY - STATE/ZERO DECELERATION |
| 2 | CONSTANT DECELERATION |

ADAPTIVE RETARDER CONTROL METHOD AND APPARATUS

TECHNICAL FIELD

The present invention relates to a control apparatus and method for use with a vehicle speed retarder utilizing closed-loop and adaptive control logic configured to alternately provide steady-state and zero deceleration irrespective of the vehicle's weight and axle ratio.

BACKGROUND OF THE INVENTION

Transmission output speed retarders are non-wearing auxiliary braking devices used in conjunction with a rotatable vehicle transmission output member or driveshaft in order to safely augment the conventional friction-based braking system or service brakes used on certain large vehicles, such as diesel-powered medium and heavy trucks or busses. Such speed retarding devices or retarders are useful in helping to slow or stop a vehicle, particularly under continuous-braking or start-stop conditions and while the vehicle is descending a relatively long, steep slope, such as a descending stretch of mountain highway. Without the use of a transmission output speed retarder, a conventional vehicle braking system operating continuously under such aggressive slope or traffic conditions may tend to wear more rapidly, potentially reducing the working life of the service brake.

Because of their added safety and maintenance benefits, retarder devices of varying designs or styles are popular transmission add-ons or accessories. Hydrodynamic and electro-dynamic retarders are two of the more commonly used retarder devices. Hydrodynamic/hydraulic retarders circulate pressurized fluid within a rotor that is enclosed within a separate, vaned stationary housing in order to induce a viscous drag by way of an opposing fluid coupling effect, thus slowing the rotating driveshaft in proportion to the fluid pressure and/or flow, i.e. the retarder request. Likewise, electro-dynamic/electric retarders produce a magnetic field in an opposite rotational direction to that of the driveshaft, thus slowing the vehicle. Other retarder methods or devices may also be used to slow a vehicle, such as exhaust brakes, engine brakes, or Jake Brakes, which act to load a vehicle engine and thereby slow its rate of rotation.

Various operator-directed control systems exist for the purpose of controlling a fixed amount of retarder capacity to be applied to the vehicle transmission. For example, an operator-actuated lever, switch, and/or brake pedal may be used to command a predetermined amount of retarder request based on, for example, a predetermined percentage of available retarder capacity or retarder torque. However, such devices may be less than optimal, as they generally require an operator to actuate a retarder mechanism each time the operator wishes to engage the retarder. Likewise, such mechanisms may provide inadequate vehicle speed control, as a given vehicle's rate of deceleration will necessarily vary along with its gross weight and/or axle ratio as the vehicle travels over different terrain and through various traffic conditions, thus requiring frequent retarder adjustments in order to maintain even a generally constant speed.

SUMMARY OF THE INVENTION

Accordingly, a vehicle retarder control apparatus is provided having a transmission with a rotatable output member and a detectable actual transmission output speed, a speed sensor operable for measuring the detectable actual transmission output speed, a plurality of user-commandable input devices for selecting a desired transmission output speed, including a retarder input device configured for selecting a relative amount of retarder request, and a controller having an algorithm for commanding a variable actual amount of retarder request in response to the desired output speed to thereby provide a controlled rate of deceleration to the vehicle.

In another aspect of the invention, the controlled rate of deceleration is determined by one of a plurality of selectable deceleration modes including a constant deceleration rate and a zero deceleration rate.

In another aspect of the invention, a retarder selector switch is operable for selecting between the plurality of selectable deceleration modes.

In another aspect of the invention, the algorithm is continuously adaptive for determining an optimal amount of actual retarder request as determined by one of a throttle level, brake level, retarder input level, and detected output speed.

In another aspect of the invention, a method is provided for precisely controlling the rate of deceleration of a vehicle having a transmission with a rotatable output member and a retarder configured to retard the speed of the rotatable output member, including measuring the actual output speed of the output member, determining a desired output speed using a plurality of user-commandable speed input devices, communicating the actual output speeds to a controller, and commanding the retarder to apply a variable amount of retarder torque to the rotatable output member based on the actual and desired output speeds to thereby achieve a controlled rate of deceleration.

In another aspect of the invention, the controller is configured with a plurality of selectable deceleration control modes including off/disabled, steady-state/zero deceleration, and constant deceleration.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
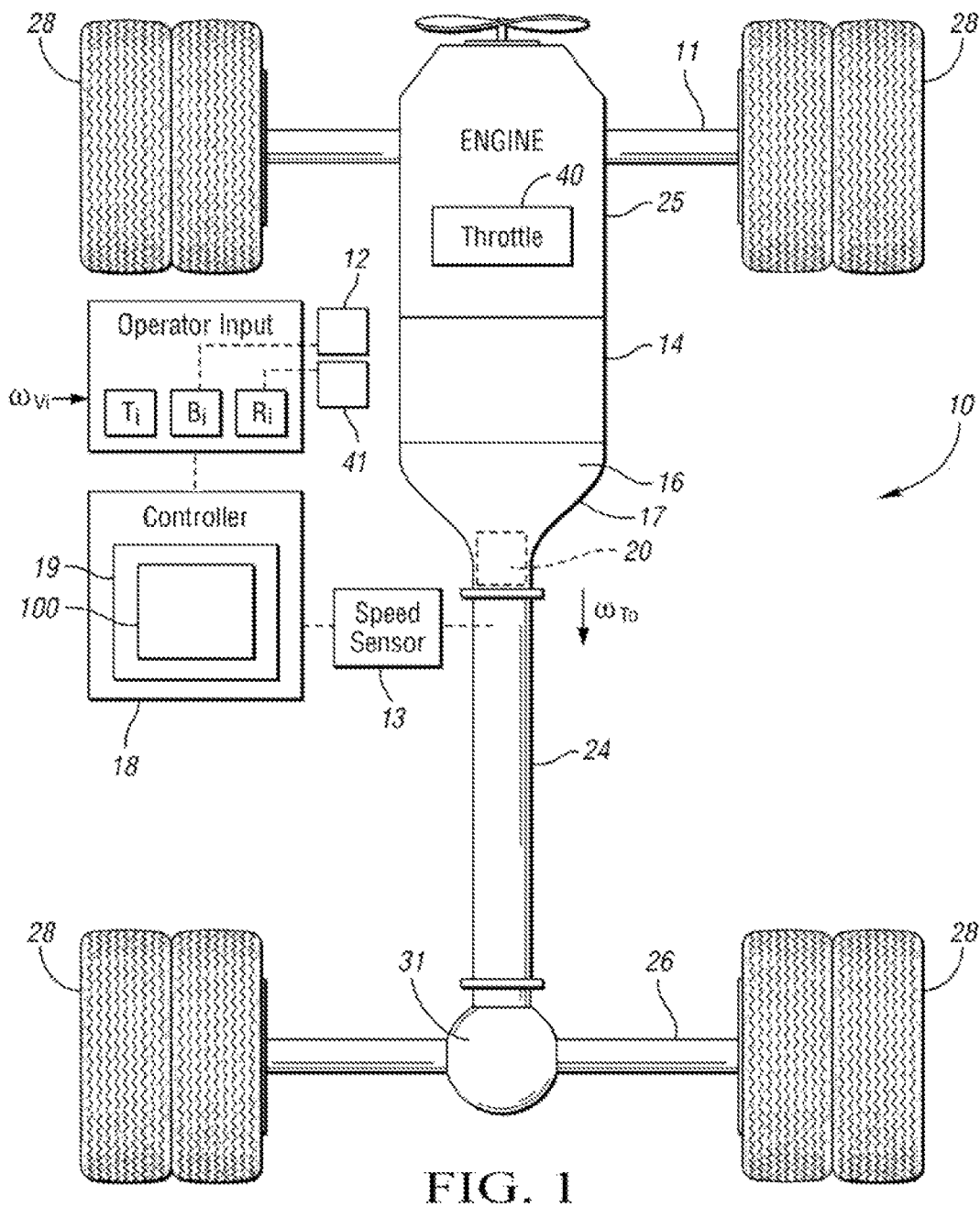
FIG. 1 is a schematic representation of a vehicle chassis having a controllable retarder and a controller according to the invention.
FIG. 2 is a table describing three deceleration or retarder modes used with the adaptive retarder control method of the invention.

Referring to the drawings wherein like reference numbers correspond to like or similar components throughout the several figures, there is shown in FIG. 1 a schematic representation of a vehicle chassis 10 having a brake 12, a retarder selector switch 41, and an engine 25 with a throttle 40, with the throttle 40 preferably being selectively actuated by an accelerator pedal (not shown). The engine 25 is selectively connectable to a transmission 16 through a conventional hydrodynamic torque converter 14. The transmission 16 is operatively attached to a speed retarding mechanism or retarder 20, with the retarder 20 preferably being positioned within a transmission case or housing 17. The transmission 16 is configured to deliver a variable transmission output speed $\omega_{To}$ to a rotatable output member 24, such as a driveshaft, with the transmission output speed $\omega_{To}$ being detectable, measurable, or otherwise determinable by a speed sensor 13 attached directly or in proximity to the output member 24.

The output member 24 is driveably connected to a rear differential 31, which is configured to distribute rotational force or torque from the output member 24 to a rear drive axle 26 for powering or driving a plurality of wheels 28. Although not shown in FIG. 1, the vehicle chassis 10 may also have a substantially similar front differential suitable for distributing torque to a front drive axle 11 for powering or driving a plurality of wheels 28 as shown in a four-wheel or all-wheel drive configuration.

The retarder 20 is preferably a hydrodynamic, i.e. hydraulically-actuated, speed retarding system which is configured to deliver a controllable supply of pressurized fluid (not shown) opposite the transmission 16 to thereby induce a viscous drag capable of providing a variable opposing torque suitable for slowing or retarding the speed or rate of rotation of the rotatable transmission 16. However, other transmission speed retarding devices such as electrodynamic retarders are also usable in accordance with the invention. For the preferred hydrodynamic retarder, the pressure and/or flow of the controllable supply of pressurized fluid, collectively referred to hereinafter as the actual retarder request, is rapidly and continuously variable in response to various user-commandable or selectable input devices, such as brake 12, retarder selector switch 41, and throttle 40. A detectable braking input level ($B_i$) corresponds to the detectable position or level of the brake 12, a detectable throttle input level ($T_i$) corresponds to the position of the throttle 40, and a detectable retarder input level ($R_i$) corresponds to a relative amount or level of desired retarder request as determined by the position of the selector switch 41. The selector switch 41 is preferably operable to communicate with the controller 18 and ultimately with the retarder 20 via data-link message, although direct/hard wiring and other control connections are also useable within the scope of the invention.

An integrated control unit or controller 18 is configured with a suitable amount of memory 19 and an adaptive control algorithm 100, as will be described in more detail hereinbelow. The controller 18 is configured to receive the communicated or transmitted transmission output speed $\omega_{To}$ from the speed sensor 13, as well as detect the levels of the plurality of user-selectable or user-commandable input devices including the throttle 40, brake 12, and retarder selector switch 41. The user-commandable input devices 40, 12, and 41 collectively generate a detectable desired speed input $\omega_{Vi}$, with $\omega_{Vi}$ preferably including at least a detectable throttle level or input $T_i$, a detectable brake level or input $B_i$, and a detectable retarder level or input level $R_i$. The controller 18 temporarily records or stores the values $\omega_{To}$ and $\omega_{Vi}$ in memory 19 for ready access by algorithm 100 of the invention, as described later hereinbelow. To provide adequate storage for capturing the rapidly changing speed data $\omega_{Vi}$ and $\omega_{To}$, memory 19 preferably includes a circular buffer and/or array having a suitable capacity, wherein the oldest stored values are dropped or deleted from the buffer and/or array as the newest or most recent values are stored or recorded. Alternately, the newly recorded values may be averaged or filtered in real time in order to reduce the required amount of storage space of memory 18.

The invention includes closed-loop and adaptive control logic to precisely control the deceleration of a vehicle irrespective of the vehicle's weight, mass, and/or axle ratio. While the retarder 20 is applied, the closed-loop control feature maintains a constant or zero rate of deceleration independent of the weight of the vehicle, and independent of the axle ratio, by continuously adapting or modifying the relative amount of retarder request as needed in order to maintain the selected rate of deceleration as described hereinbelow. The continuously adaptive feature is used to learn or determine an optimal amount of retarder request based in part on the amount of deceleration requested by the operator and changing vehicle speed.

Preferably, for start-stop operations, the driver or operator would determine a desired retarder input $R_i$ using the selector switch 41, which is then communicated or transmitted to the controller 18 as one of the input variables useable within the algorithm 100. For downhill speed control, for example, the operator would preferably select a steady-state, i.e. a constant speed, cruise-control, or zero deceleration condition. The controller 18 would in turn command the appropriate amount of actual retarder request from the retarder 20 to safely achieve and maintain the desired deceleration rate of the vehicle while preventing overload of the braking system.

Turning to FIG. 2, a table is shown describing three deceleration or retarder modes, denoted as off/disabled, $M_R$ 1, and $M_R$ 2 for simplicity and useable with the algorithm 100 of the invention. "Off/disabled" represents an off/disabled retarder 18, with no associated deceleration control result. Such a condition may be desirable, for example, when a vehicle operator does not require or desire auxiliary braking, as in a situation where the vehicle braking system has ample capacity to safely control the speed of the vehicle. Alternately, a driver may select "off/disabled" in slippery or hazardous conditions, such as on an icy road, in order to maintain full manual control over the speed of the vehicle. Next, $M_R$ 1 represents a zero deceleration condition. That is, the user-commandable desired input speed $\omega_{Vi}$ is equal to the transmission output speed $\omega_{To}$, with zero deceleration being the control result. Finally, $M_R$ 2 represents a controlled non-zero deceleration condition, wherein the deceleration control result is a constant rate of deceleration, i.e. the desired rate of deceleration $-\alpha_{Vi}$ is equal to the actual rate of deceleration $-\alpha_{Va}$.

Figure 3:
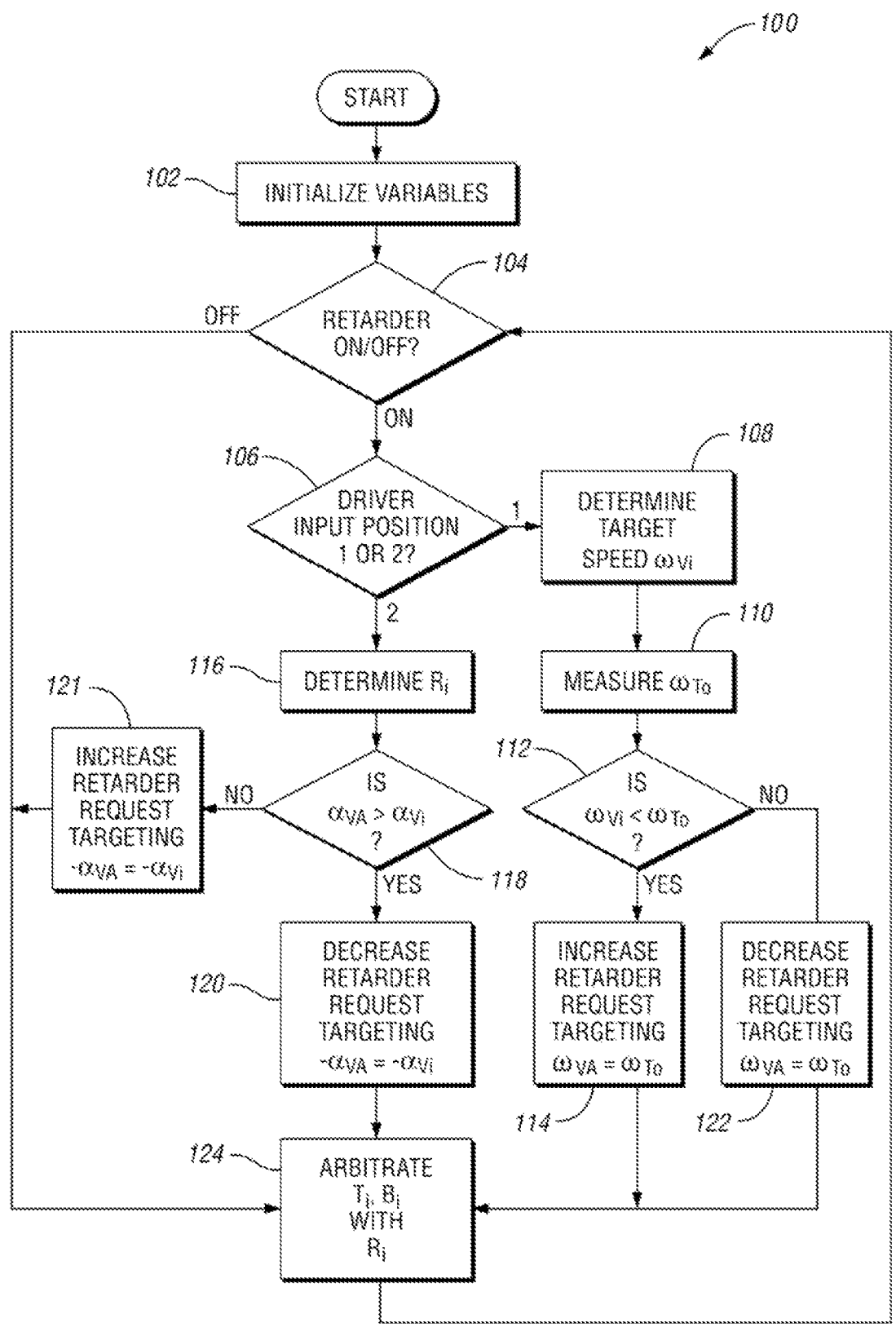
FIG. 3 is a flow chart describing the adaptive method or algorithm of the invention for precisely controlling the deceleration rate of a vehicle.

Turning to FIG. 3, a method or algorithm 100 of the invention is shown for precisely controlling the deceleration rate of a vehicle at least partially independently of the vehicle's weight, mass, and axle ratio. The algorithm 100 uses the previously-described detectable throttle input or level $T_i$, braking input or level $B_i$, and retarder input or level $R_i$, as well as the transmission output speed $\omega_{To}$ as measured or detected by speed sensor 13, to precisely control the rate of deceleration of the vehicle to maintain a predetermined mode as shown in FIG. 2 and explained hereinabove.

The algorithm 100 begins with step 102 preferably being performed once upon each start-up of the engine 25 (see FIG. 1), wherein the memory 19 of controller 18 is purged of old or residual data, and the variables $\omega_{To}$, $T_i$, $B_i$, $R_i$, $\omega_{Vi}$, and any derived or calculated deceleration variables $-\alpha_{Va}$ and $-\alpha_{Vi}$ are initialized or zeroed. The deceleration variables are represented herein as negative quantities only to represent a negative acceleration condition, but are otherwise read as absolute values. i.e. a deceleration rate represented as −1000 revolutions per minute (rpm) is considered to be greater than a deceleration rate of −500 rpm, as determined by their relative absolute values. The algorithm 100 then proceeds to step 104.

In step 104, the algorithm 100 determines whether the retarder 20 is turned on or activated. This selection is preferably made by the operator or driver of the vehicle before or shortly after engine start-up by activating a retarder selector switch 41 that is readily accessible to the driver within the passenger compartment or cabin of the vehicle and operable to turn enable/disable the retarder 20 as well as select a retarder input $R_i$, as described later hereinbelow. If the retarder 20 is off or not activated, the retarder deceleration control capability is temporarily disabled, and the algorithm 100 proceeds to step 124. If, however, the retarder 20 is turned on or activated, the algorithm 100 proceeds to step 106.

In step 106, the algorithm 100 determines the retarder input $R_i$, which as explained previously hereinabove is preferably selected by an operator using a retarder selector switch 41. A selected $R_i$ level preferably corresponds to a position of selector switch 41 wherein "1" and "2" relate back to retarder or deceleration modes $M_R 1$ and $M_R 2$, respectively, as explained previously hereinabove and shown in FIG. 2. If Mode 1 is selected, the algorithm 100 proceeds to step 108. If Mode 2 is selected, the algorithm 100 proceeds to step 116.

In step 108, with Mode 1, i.e. a steady-state/zero deceleration condition, having been selected in the preceding step, the algorithm 100 determines the desired speed input $\omega_{Vi}$ by using any or all of the detectable throttle, brake, and retarder inputs or levels $T_i$, $B_i$, and $R_i$, respectively, and temporarily records or stores the value $\omega_{Vi}$ in memory 19. The algorithm 100 utilizes the detectable throttle input $T_i$ to continuously increase or revise the stored value $\omega_{Vi}$ until the operator commands zero throttle, i.e. stops depressing the accelerator pedal, and utilizes the detectable braking input $B_i$ to reduce or decrease the stored value $\omega_{Vi}$ in relation to the duration and/or level of commanded braking. Once the target or desired speed input $\omega_{Vi}$ is determined, the algorithm 100 proceeds to step 110.

In step 110, the algorithm 100 detects or measures the actual transmission output speed $\omega_{To}$, preferably using the speed sensor 13 as shown in FIG. 1 as previously described hereinabove. Once $\omega_{To}$ is determined and stored in memory 19, the algorithm proceeds to step 112.

In step 112, the algorithm 100 compares the stored value of the measured transmission output speed $\omega_{To}$ to the desired speed input $\omega_{Vi}$, to determined if and to what extent the retarder 20 should be applied. If $\omega_{Vi}$ is less than or equal to $\omega_{To}$, the algorithm 100 recognizes that the vehicle is traveling at a faster rate than desired and commanded by the operator, and therefore proceeds to step 114. If, however, $\omega_{Vi}$ is determined to be greater than $\omega_{To}$, the algorithm 100 recognizes that the vehicle is traveling at a slower rate than desired or commanded by the operator and proceeds to step 122.

In step 114, the algorithm 100 increases the retarder input $R_i$ as required, targeting $\omega_{Vi}$ to be equal to $\omega_{To}$, that is, an equilibrium condition wherein the desired speed input is equal to the actual transmission output speed. The required rate of increase of $R_i$ may be determined by a variety of factors including the braking input $B_i$ and the difference between $\omega_{To}$ and $\omega_{Vi}$. In order to increase the response time of the control loop and to frequently check for more recent vehicle speed inputs, i.e. $T_i$, $B_i$, and/or $R_i$, step 114 is preferably sustained only for a fixed period of time. Therefore, the desired equilibrium condition where $\omega_{Vi}$ actually equals $\omega_{To}$ may not be fully realized until a number of control loop cycles have been completed. For this reason, the term "targeting" is employed within FIG. 3 describing a variable amount of movement or progress that may be achieved toward the desired equilibrium condition, i.e. $\omega_{Vi}=\omega_{To}$, during the amount of time allocated to the control loop cycle. The algorithm 100 then proceeds to step 124.

In step 116, the algorithm 100 is now operating in the second mode, or $M_R 2$ (see FIG. 2), i.e. a non-zero and constant, i.e. steady-state, rate of deceleration. The algorithm 100 determines the amount of retarder input $R_i$ as determined or selected by the operator. Preferably, a plurality of retarder levels are available to the operator using switch 41 (see FIG. 1), with each level relating to a progressively greater relative amount of retardation. However, the retarder input $R_i$ is not a fixed quantity or otherwise directly related or tied to a percentage or amount of available retarder capacity. Rather, $R_i$ is preferably tied to a relative level of retardation that the algorithm 100 will utilize as one of the input variables comprising the desired speed input $\omega_{Vi}$ along with other speed and deceleration variables in order to continuously adjust the amount and duration of retarder request on an as-needed basis, as dictated by rapidly changing vehicle speed conditions.

Preferably, a switch, lever, or other input device is configured with three or more input levels corresponding to three or more retarder request levels that the driver can select between as desired. The algorithm 100 is also preferably configured to adjust the selected retarder input $R_i$ upward or downward as required by the changing external operating conditions or vehicle speed as needed, such as when a low level of retarder control is initially selected on a flat stretch of highway and the vehicle suddenly and unexpectedly enters a steep downgrade, thereby requiring an aggressive amount of braking represented by braking input $B_i$. Once $R_i$ has been determined, the algorithm 100 proceeds to step 118.

In step 118, the driver or operator-selected level of retarder input $R_i$ selected in step 116 is used to determine if the actual rate of deceleration of the vehicle ($-\alpha_{VA}$) is greater than the desired or input rate of deceleration ($-\alpha_{Vi}$). Since acceleration and deceleration are a function of vehicle speed over time, the controller 18 is preferably configured to rapidly derive these variables directly from the transmission output speed $\omega_{To}$ and throttle input $T_i$, and to store the derived deceleration variables in memory 19. If the value $-\alpha_{VA}$ is determined to be greater than the value $-\alpha_{Vi}$, a condition in which the vehicle is decelerating at a more rapid rate than desired, the algorithm proceeds to step 120. If, however, the value $-\alpha_{VA}$ is determined to be less than the value of $-\alpha_{Vi}$, i.e. the vehicle is determined to be decelerating at a lesser rate than desired, and the algorithm proceeds to step 121.

In step 120, the algorithm 100 evaluates the differential between the values $-\alpha_{VA}$ and $-\alpha_{Vi}$ and adjusts the retarder request accordingly. By decreasing the retarder request, the vehicle is permitted to decelerate at a lesser rate. As described for step 114, step 120 is preferably not held or sustained until $-\alpha_{VA}$ actually equals $-\alpha_{Vi}$, and thus a suitable amount of movement toward the desired equilibrium condition, i.e. $\alpha_{VA}=-\alpha_{Vi}$, occurs in step 120 within the amount of control loop time allocated to this step. The algorithm 100 then proceeds to step 124.

In step 121, the algorithm 100 evaluates the differential between the values $-\alpha_{VA}$ and $-\alpha_{Vi}$ and increases the retarder request accordingly. By increasing the retarder request, the vehicle is permitted to decelerate at an increased rate. As with steps 114 and 120, step 121 is preferably not held or sustained until $-\alpha_{VA}$ actually equals $-\alpha_{Vi}$, and thus a suitable amount of movement toward the desired equilibrium condition, i.e. $\alpha_{VA}=-\alpha_{Vi}$ occurs in step 121 within the amount of control loop time allocated to this step. The algorithm 100 then proceeds to step 124.

In step 122, the algorithm 100 decreases the retarder input $R_i$ as required, targeting $\omega_{Vi}$ to be equal to $\omega_{To}$, that is, an equilibrium condition wherein the desired speed input is equal to the actual transmission output speed. As described for steps 114 and 120, step 122 is preferably not held or sustained until $\omega_{VA}$ actually equals $\omega_{Vi}$, and thus a suitable amount of movement toward the desired equilibrium condition, i.e. $\omega_{VA}=\omega_{Vi}$, occurs in step 122 within the amount of control loop time allocated to this step. The algorithm 100 then proceeds to step 124.

In step 124, the algorithm 100 has reached a condition where the desired mode, i.e. disabled, Modes 1 or 2 (see FIG. 2), has been substantially realized. For example, in the steady-state/zero deceleration condition of Mode 1, the vehicle is maintaining the desired rate of speed, and in the constant deceleration condition of Mode 2 the vehicle is decelerating at the desired rate. The algorithm 100 then continuously receives and interprets user inputs such as $T_i$ and $B_i$ against the existing retarder input $R_i$, if any, and arbitrates accordingly, i.e. determines based on these additional inputs whether the equilibrium has been disturbed, or whether the driver requires a different level of $R_i$ than was previously input. Once step 124 has been completed, the algorithm 100 returns to step 104 and repeats.

As described hereinabove, step 124 could be programmed to provide a safety backup to the situation in which an operator selects "off" at step 104. Under those circumstances, the algorithm 100 could determine whether activation of the retarder system is required in light of the transmission output speed $\omega_{To}$, braking input level $B_i$, and throttle input $T_i$. If such automatic override is not desired, step 124 would read retarder input $R_i$ as a zero value for the off/disabled mode $M_R$ 1, with no arbitration result relative to the operation of the retarder system.

While the best modes for carrying out the invention have been described in detail, those familiar with the art to which this invention relates will recognize various alternative designs and embodiments for practicing the invention within the scope of the appended claims.

The invention claimed is:

1. A vehicle transmission retarder control apparatus for a vehicle, the apparatus comprising:
    a transmission having a rotatable output member with a detectable actual transmission output speed;
    a speed sensor operable for measuring said detectable actual transmission output speed;
    a plurality of user-commandable input devices operable for selecting a desired transmission output speed, including a user-commandable retarder input device configured to allow a user to select a relative amount of retarder request;
    a speed retarding system adapted to provide an opposing torque suitable for slowing a rate of rotation of said rotatable output member in response to said relative amount of retarder request; and
    a controller having an algorithm for commanding a variable actual amount of retarder request from said speed retarding system in response to said desired output speed and said relative amount of retarder request to thereby provide a controlled rate of deceleration to said vehicle.

2. The apparatus of claim 1, wherein said controlled rate of deceleration is determined by one of a plurality of user-selectable deceleration modes including constant deceleration and zero deceleration.

3. The apparatus of claim 2, including a retarder selector switch operable for selecting between said plurality of user-selectable deceleration modes.

4. The apparatus of claim 3, wherein said retarder selector switch is operable by one of direct wiring and datalink message.

5. The apparatus of claim 1, including an engine throttle having a detectable throttle level and a brake having a detectable brake level, wherein said algorithm is continuously adaptive for determining an optimal amount of said actual amount of retarder request as determined by at least one of said throttle level, said brake level, said relative amount of retarder request, and said detected actual transmission output speed.

6. The apparatus of claim 1, wherein said controller is configured to initiate said algorithm upon the occurrence of a predetermined event selected from the group of engine start up and selection of one of said plurality of deceleration modes.

7. The apparatus of claim 1, wherein said vehicle has a weight and axle ratio, and wherein said controller is operable to command said variable actual retarder request at least partially independently of said weight and said axle ratio.

8. A vehicle comprising:
    a controller;
    an engine having a throttle;
    a transmission operatively connected to said engine and having a rotatable output member with a detectable actual output speed;
    a controllable retarder operable to apply an opposing torque to said output member for retarding the speed of said output member;
    a plurality of user input devices operable to determine a desired output speed; and
    at least one speed sensor operable to detect said actual output speed;
    wherein said controller is in electronic communication with said plurality of user input devices, said speed sensor, and said controllable retarder, and operable to command said opposing torque for precisely controlling the rate of deceleration of said vehicle based on said actual output speed and said desired output speed, said opposing torque being determined at least partially independently of the weight and axle ratio of said vehicle.

9. The vehicle of claim 8, wherein said controller includes an algorithm having adaptive and closed-loop control logic for determining an optimal amount of said opposing torque based at least partially on said actual output speed and said desired output speed.

10. The vehicle of claim 8, wherein said plurality of input devices includes said throttle having a detectable throttle level, a brake having a detectable brake level, and a retarder selector switch having a detectable retarder input.

11. The vehicle of claim 8, wherein said controller is operable to command said opposing torque at least partially independently of said desired output speed as required to precisely control said rate of deceleration as needed.

12. A method for precisely controlling a desired rate of deceleration of a vehicle having a transmission with a rotatable output member and a retarder configured to retard the speed of said rotatable output member, the method including:
    measuring the actual output speed of said transmission output member;
    communicating said actual output speed to said controller;
    determining a desired output speed using a plurality of user-commandable speed input devices, including a retarder input device adapted to allow a user to select a relative amount of retarder request; and
    commanding said retarder to apply a variable retarder torque as an opposing torque to said rotatable output member based on said actual and said desired output speeds to thereby achieve said desired rate of deceleration.

13. The method of claim 12, wherein said controller is configured with a plurality of user-selectable deceleration control modes including off/disabled, steady state deceleration, and zero deceleration.

14. The method of claim 12, wherein said retarder input device is a retarder selector switch adapted to allow said user to select from a plurality of selectable deceleration control modes.

15. The method of claim 12, wherein said variable retarder torque is continuously adjusted to provide a constant rate of deceleration irrespective of the weight and axle ratio of said vehicle.

16. The apparatus of claim 1, wherein said speed retarding system is configured as a hydrodynamic system configured to induce a viscous drag capable of providing said opposing torque suitable to said rotatable output member.

17. The vehicle of claim 8, wherein said controllable retarder is configured as a hydrodynamic system configured to induce a viscous drag capable of providing said opposing torque suitable to said rotatable output member.

* * * * *